United States Patent [19]
Robinson

[11] 3,759,164
[45] Sept. 18, 1973

[54] INDOOR-OUTDOOR COOKER

[76] Inventor: Sirman Robinson, 2335 Whispering Pines Rd. Apt. No. 1, Albany, Ga. 31705

[22] Filed: Oct. 13, 1971

[21] Appl. No.: 188,783

[52] U.S. Cl. .................................. 99/413, 126/215
[51] Int. Cl. ............................................ A47j 37/12
[58] Field of Search ............................. 99/413, 403; 126/25 R, 29, 30, 9 R, 9 B, 38, 43, 261, 284, 343.5, 214, 215

[56] References Cited
UNITED STATES PATENTS

| | | | |
|---|---|---|---|
| 1,353,265 | 9/1920 | Oshige | 126/215 |
| 1,836,156 | 12/1931 | Detwiler | 126/215 |
| 625,586 | 5/1899 | Morgan | 99/413 |

Primary Examiner—Leon G. Machlin
Attorney—Neil F. Markva et al.

[57] ABSTRACT

A portable cooking apparatus for the preparation of food wherein a large cooking bowl is included as part of the apparatus. A fuel burner is centrally positioned below the bowl and within concentric baffle rings to provide a combustion and heat chamber to improve the efficiency of the burner. The curve-sided cooking bowl rests within the outer baffle ring and is spaced from this ring to obtain improved temperature control. Extendible legs are provided to position the cooking bowl at a convenient height for outdoor or indoor usage. An open mesh basket having a configuration similar to the bowl is positioned inside the bowl to facilitate the food handling. Various burner and valve combinations are included for use with the heat chamber.

9 Claims, 16 Drawing Figures

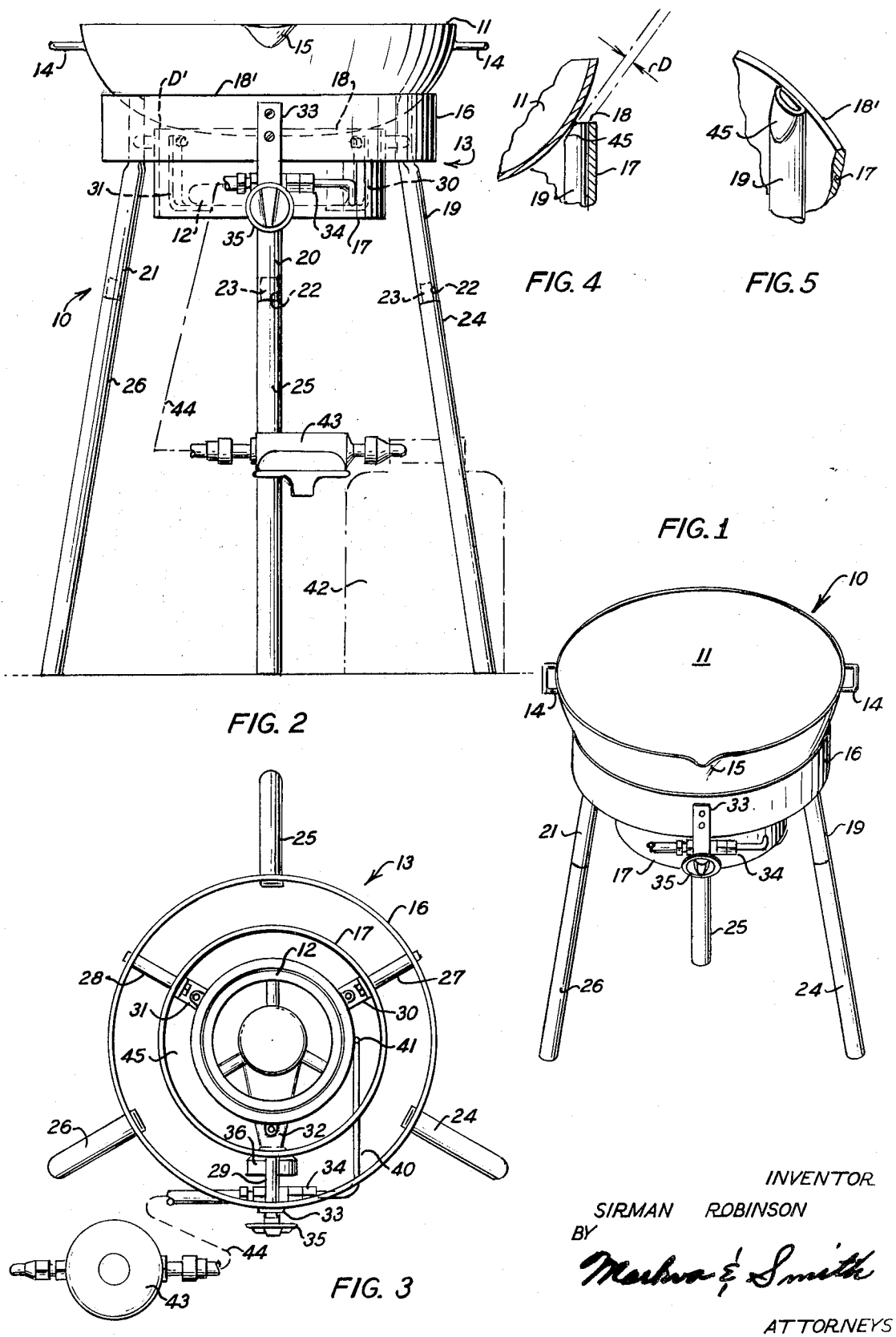

PATENTED SEP 18 1973 3,759,164
SHEET 2 OF 3
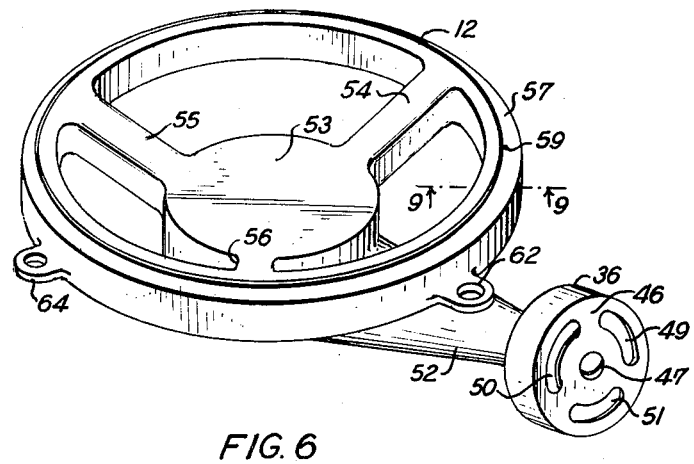
FIG. 6
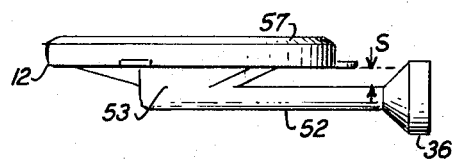
FIG. 7
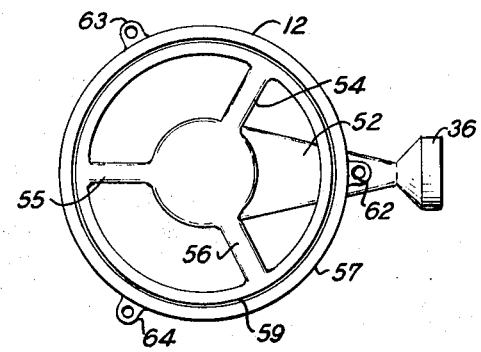
FIG. 8
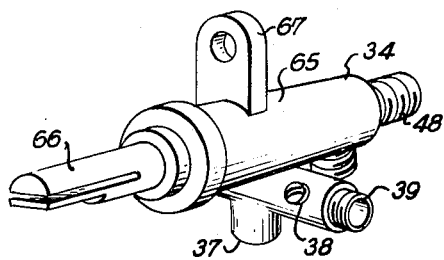
FIG. 10
FIG. 9
INVENTOR
SIRMAN ROBINSON
BY
Markva & Smith
ATTORNEYS INVENTOR
SIRMAN ROBINSON
BY
Markva & Smith
ATTORNEY

INDOOR-OUTDOOR COOKER

BACKGROUND OF THE INVENTION

This invention relates to portable cooking stoves or devices which are designed for efficient fuel combustion and cooking temperature control. The type of cooker to which this invention is generally directed has been in the past called a "fondue" cooker or a "Chinese pot" cooker.

Most portable cookers which are presently in use are usually of the charcoal grill or gasoline camp stove configuration. None of these devices generally include a cooking bowl or pot which is designed as an integral part of the apparatus. In addition, "fondue" type of cooking where the food is usually prepared by individuals by dipping meat chunks or prepared dippable foods in hot cooking oils or sauces is seldom performed on the patio or in campground or picnic areas. The preparation of seafood, meats or other foods by deep fat frying in the outdoors, such as at the beach, mountains or in one's own backyard is almost non-existent. Thus, there is a present need for an apparatus of this type which is capable of being easily transported and large enough to accommodate the size groups that can be normally expected.

Another limitation, common in the prior art, is that most outdoor cookers presently on the market produce odors and fumes during the cooking process which prohibits their use indoors unless adequate ventilation is provided.

Another problem that has been associated with outdoor cooking is the control of the cooking temperature. Usually wind and drafts cause the temperature of the fire bed or burner to increase or concentrate the heat in certain areas or "hot spots" on the cooking surface. Constant attention must be given to controlling the cooking temperature such as by adjusting combustion air dampers, shielding the burner or rotating the grill or the entire cooker during the cooking process to even out or balance the heat across the cooking surface.

Another problem which is usually created in outdoor cooking is the generation of billowing clouds of smoke. Invariably the smoke seems to follow the guests or the cook, causing annoyance or discomfort.

SUMMARY OF THE INVENTION

The present invention is directed to an indoor-outdoor food cooking apparatus which can be safely and conveniently utilized in either the home or the out of doors. It is sized to be portable and can be easily moved to wherever this type of cooking is desired. A large, shallow cooking bowl or pot is included for direct cooking of the food, or the bowl can be filled with a cooking liquid, such as sauce, fat or water. A wire mesh basket which fits inside the bowl is provided to facilitate handling of the food during the cooking process. The bowl is required to have a gently curved bottom and sides for use with this apparatus. A fuel burner is positioned below and centered under the cooking bowl with a series of concentric rings positioned surrounding the fuel burner. The spacing and positioning of these rings with respect to each other and with respect to the cooking bowl is of major importance in this invention. Any type of stand or support means can be included so as to provide sufficient clearance between the burner and rings and the adjacent support object, such as the ground or table. These legs are extendible so that they can be adjusted to provide a comfortable height for the cooker.

It is therefore one object of the present invention to provide an improved portable cooking device which can be easily transported to or from the home or the out of doors.

It is another object of this invention to provide a cooking apparatus which is safe and economical in operation. Provision is made for sufficient gas mixing and burning in a central combustion area by use of baffles and for retaining the heat and for evenly distributing this heat across the entire outer surface of the cooking bowl.

A further object of this invention is to provide a cooking device whereby all classes of foods can be prepared. This includes the preparation of foods for eating as well as for preservation, such as freezing or canning. It is intended that all types of foods, such as vegetables, fruits, seafoods, fish and meats can be prepared.

Another object is to provide a cooking device which is capable of preparing foods in a clean and odorless fashion.

The present invention attains this by providing precise temperature control for the cooking process and prevention of hot spots and burning of the food, one of the major causes of fumes and odors. The cooking bowl collects the food juices and prevents them from dripping into the burner which is a major cause of smoke and flash fire.

The novel features that are considered characteristic of this invention are set forth with particularity in the appended claims. The invention itself, both as to its construction and method of operation, as well as additional objects and advantages thereof, will best be understood from the following description when read in connection with the accompanying drawings.

BRIEF DESCRIPTION OF THE DRAWINGS

FIG. 1 is a perspective view of the cooking apparatus of this invention;

FIG. 2 is a front view of the apparatus showing a fuel supply for use with this invention;

FIG. 3 is a plan view showing the burner and ring support arrangement with the cooking bowl removed;

FIG. 4 is a detailed section of the vessel and ring support;

FIG. 5 is an enlarged perspective view of the spacer arrangement as shown in FIG. 4;

FIG. 6 is a perspective view of a burner used in this invention;

FIG. 7 is a side view of the burner shown in FIG. 6;

FIG. 8 is a plan view of the burner shown in FIGS. 6 and 7;

FIG. 9 is a cross-sectional view taken along the line 9—9 of FIG. 6;

FIG. 10 is a perspective view of the gas valve arrangement used in this invention;

DESCRIPTION OF THE PREFERRED EMBODIMENT

Figure 11:
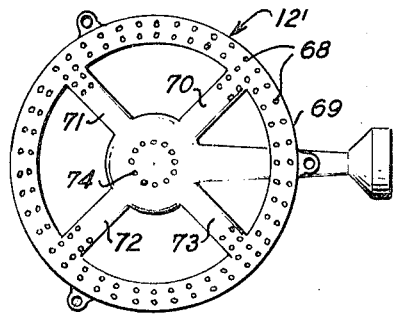
FIG. 11 is a top plan view of another burner used in this invention.

Referring now to the drawings in detail, FIGS. 1 – 3 show various views of the complete indoor-outdoor cooker 10. As can be seen in these figures, the cooking bowl or pot 11 is of a shallow, curved or cycloid shape and can be of whatever diameter that is desired, depending upon the intended use for the cooker. It can be fabricated from any material, such as steel, cast iron, Pyrex, high-temperature plastics, etc. Convenient overall diameters for the bowl 11 and its associated basket, support and burner equipment are 16 and 20 inches. The round bottom and sides make for easier cleaning and care as well as providing for even distribution of heat across the entire bottom and sides of the bowl 11.

The burner 12 and support assembly 13 for this invention are designed to properly correspond to the size of bowl 11 that is desired. The bowl 11 includes a pair of handles 14 which are positioned on the outside of the bowl and diametrically opposite to each other. A pouring spout 15 is formed in the top edge of the bowl 11 and spaced equally from the handles 14 to facilitate removal of the fluid from the bowl for disposal or storage.

An open mesh basket, fabricated from any type of non-corroding material suitable for cooking purposes, such as stainless steel, and having a shape to fit inside the bowl 11, is provided. Handles are included at the upper edge to support the basket within the bowl 11 and facilitate its removal from the bowl. The food can be placed in the basket where it can be contained and easily removed from the bowl when cooked.

The framework for the support structure, shown generally at 13, is composed of two circular baffle rings 16, 17 of approximately equal depth which are mounted concentrically within each other. In the present embodiment, the diameter of the outer baffle ring 16 is approximately 90 percent of the diameter of the cooking bowl 11 and depends primarily upon the curvature of the sides of the bowl 11. The diameter of the inner baffle ring 17 in the present embodiment is approximately two-thirds of the diameter of the outer ring 16. The inner baffle ring 17 is positioned so that the top edge 18 of this ring 17 is at a dimension which is approximately half of the depth of the outer support baffle ring 16. Thus, the lower edge of the inner baffle ring 17 extends a corresponding distance below the bottom edge of the outer baffle ring 16.

A three-point suspension system consisting of three short leg members 19, 20, 21 are permanently attached to the inside surface of the outer baffle ring 16. It is to be understood that any number of legs can be used, but the use of three legs is preferred as will be explained later. The upper ends of the short leg members 19, 20, 21 are flattened for a distance which corresponds to the depth of the outer support baffle ring 16 and shaped to fit the curvature of the inside surface of this ring. The short legs 19, 20, 21 are equally spaced around the perimeter of the baffle ring 16 and are intended to be permanently attached to this ring as by welding. The top edges of the short legs 19, 20, 21 are to be positioned approximately flush with the top leg 18' of the outer support baffle ring 16. The lower portions of these legs are bent outwardly at the break line of the flat section so that the lower portions of the short legs 19, 20, 21 are spread a sufficient amount to provide additional stability to the support framework 13 and the cooking bowl 11. The lower end of each of the short legs has an internal thread 22 formed within the bore for attachment of leg extensions 24, 25, 26. The internal threads 22 thus are protected when the short legs are used without the extension. Each of the leg extensions 24, 25, 26 is provided with a complementary external threaded stud member 23 which can be screwed into the corresponding threads 22 in the short legs 19, 20, 21 to provide an easy means for attachment of the extensions so that the bowl 11 can be positioned at a convenient height for cooking.

This cooker is designed to be used with any type of liquid or gaseous fuel which is convenient. The primary considerations are to provide a burner which is compatible with the type of fuel that is desired to be used. Most burners can be easily converted by replacing the orifice in the air mixing chamber with an orifice of proper size for the fuel used. In the present embodiment, a fuel burner 12 which is designed for propane is disclosed.

The inner baffle ring 17 is suspended from the outer support baffle ring 16 by three spacing sleeves and bolt assemblies 27, 28, 29. Three holes are located in the lower half of the outer support ring 16 and are equally spaced between the attachment points of the short legs 19, 20, 21. Three corresponding holes are equally spaced in the upper perimeter of the inner baffle ring 17. These latter holes are located so that the top edge of the inner baffle ring will be positioned in a predetermined spaced relationship from the bottom surface of the cooking bowl.

Three L-shaped burner support brackets 30, 31, 32 are provided to position the burner 12 concentrically within the inner burner ring 17. The lower leg of each L-shaped bracket is provided with a ledge for the attachment and support of the bottom side of the burner 12. A hole is located in the opposite end of the long side of each of the brackets 30, 31, 32. The burner brackets 30, 31, 32 are positioned on the inside surface of the inner baffle ring 17. Each of the baffle support bolts 27, 28, 29 is threaded through the L-shaped bracket hole, the inner bracket hole, the corresponding hole in the outer support baffle ring and the spacing sleeves 27, 28, 29 are positioned on the bolts between the inner and outer baffle rings 16, 17. Thus, the baffle rings 16, 17 are held in an equally spaced relationship. The long side of each of the L-shaped burner brackets 30, 31, 32 is designed so that the bottom side of the fuel burner 12 is positioned approximately even with the bottom edge of the inner baffle ring 17.

A gas valve support bracket 33 is attached to the outside surface of the outer support baffle ring 16. Any method of attachment can be used such as screws, bolts, or welding. The gas control valve 34 and control knob 35 are positioned at the lower end of this bracket so that they will be positioned near to the mixing chamber 36 for the fuel burner assembly 12. A suitable tube or duct 76, 77 is provided to connect the valve 34 with the burner 12. Details of this valve 34 and the fuel burner 12 will be provided later. The gas inlet boss 37 (FIG. 10) to a gas control valve 34 is provided with a pilot flame control valve 38 and tubing 40. This tubing 40 is connected to the pilot flame nozzle 41 which is located adjacent to the outside edge of the fuel burner 12. The pilot flame is provided so that a continuous flame will be available as required to ignite the burner 12 and to provide temperature control so that the burner itself can be turned off as required and reignited when desired. In addition, the pilot light is provided as a safety feature to reignite the burner if the flame is extinguished by wind or draft. The pilot flame nozzle 41 can be provided with a windshield (not shown), if desired, to protect the pilot flame from being extinguished by the wind or draft when the cooker is used outdoors.

Any type of convenient fuel source, such as compressed gas bottles, fuel tank or pipeline, may be used with this device. In the present embodiment, see FIG. 2, a small pressurized liquid propane storage bottle 42 is illustrated. A pressure regulator 43 is attached to the bottle to permit the expansion of the propane to a gaseous state so that only a gas is permitted to enter the control valve 34 of the device. A flexible hose 44 of any length desired can be used to connect the propane gas regulating valve 43 to the inlet of the control valve 34 on the indoor-outdoor cooker.

As can be seen in detail in FIGS. 4 and 5, the top edges of the short legs 19, 20, 21 are designed to provide a three-point suspension for the cooking bowl. This type of suspension has the added advantage of permitting the bowl 11 to be leveled with respect to the support baffle ring 16 irrespective of the type of terrain upon which the cooker is setting. An opening space D is provided between the top edge of the outer baffle ring 16 and the bottom of the cooking bowl 11. The top edge 45 of the leg towards the inner portion of the cooker is flattened towards the inner ring surface to provide the desired spacing D between the bowl 11 and the top edge of ring 16. Thus, adjustment can be provided to obtain the desired equal spacing around the perimeter. A second space D' is provided between the top edge of the inner baffle ring 17 and the bowl 11. In the present embodiment, this spacing is approximately one-eighth inch while the spacing between the top of the inner baffle ring and the bosl is approximately three-eighths inch. The space D is the more critical of the two and it is understood that both of these spaces will vary depending upon the size of the bowl 11 and baffle ring 16 combination that is used.

The space above the burner 12 and within the inner baffle 17 forms a secondary combustion chamber 45 whereby the air-gas mixture is combined with additional air drawn in from below the inner baffle ring 17. The secondary combustion chamber provides better mixing and complete combustion thus obtaining a more efficient utilization of the fuel. The inner space D' provides a control for the amount of additional air that is introduced and the even distribution and release of heat upwardly along the gently curved surface of the cooking bowl 11. This heat distribution is further controlled by the outer support baffle ring 16 and the space D so that a continuous even flow of heat is permitted to surround the entire outer surface of the cooking bowl. By this method, proper and precise temperature control during the cooking process is obtained.

As an additional feature, the outer support baffle ring 16 and the clearance or space D between the top edge of this ring and the bowl reduce the amount of heat that is lost along the upper surface of the vessel. Thus, exposed flame is reduced to a minimum to provide a safety factor for the cook or housewife.

In FIGS. 6, 7, 8 and 9 there is shown an embodiment of a gas burner 12 that can be used in this invention. This particular burner is designed for use with propane but can be used with any type of gaseous fuel, provided the proper inlet orifice size is used. A cylindrically shaped air-fuel mixing chamber 36 is provided. One end of the chamber 36 includes a flat surface 46. A threaded hole 47 is provided in the center of this surface for the attachment of the gas control valve outlet 48. This outlet 48 from the control valve 34 incorporates an orifice (not shown) of proper size for the gas that is used. Three slots 49, 50, 51 are spaced radially from the center hole 47 and are spaced from the outer perimeter of the chamber. An air control damper plate (not shown) which has three corresponding slots is positioned on the outside or inside surface of the front surface 46 and can be spring-loaded to provide a holding means for positioning the slots of the damper plate with respect to the slots of the front surface 46 of the chamber 36. The air damper plate and the three air slots are provided as a fuel-air control means for proper adjustment of the burner combustion. The provision of the three slots 49, 50, 51 instead of the conventional two slots has been found to provide better mixing of the fuel and air by increasing the turbulence in the mixing chamber 36.

The opposite end of the mixing chamber from the front face 46 is connected to a flattened, cone-shaped duct 52 which is attached to a hollow center distribution chamber 53. Three equally spaced hollow gas conduit support members 54, 55, 56 extend from the center chamber 53 to the burner ring 57. These support conduits extend upwardly and outwardly from the center chamber 53 in order to elevate the burner ring 57 above the center chamber 53 and the duct 52. The dimension "S" designates the clearance between the underside of the burner ring 57 and the top of duct 52. Three-quarters of an inch has been found to be desirable for this clearance. The burner ring 57 is composed of a hollow annular ring 58 which contains a continuous slot 59 in the top wall of the ring cavity.

A cross section of the burner annular ring 57 taken through the line 9—9 in FIG. 6 is displayed in FIG. 9. As can be seen, the annular ring 57 is a hollow, thin-wall construction with the top surface of the ring composed of two outwardly extending and converging edges 60, 61. A uniform space is provided between the upper edges 60, 61 forming a ring slot 59 around the entire circumference of the burner 12. This ring slot 59 provides a continuous sheet of flame around the periphery of the burner 12 and thus concentrates the heat entirely around the bottom of the cooking bowl 11. By this method, consistent and uniform heat is obtained; an improvement over the conventional burner which normally utilizes a series of orifices or holes in the top surface of the annular ring. The use of three gas conduit supports 54, 55, 56 between the center chamber 53 and the burner ring 57 has been found to provide a more even distribution of the air-fuel mixture to the ring 57 in order to prevent hot spots in the combustion flame. Thus, an even flame is obtained around the entire periphery of the burner ring 57.

Three mounting tabs 62, 63, 64 are provided along the outside periphery of the annular ring 57. These tabs are equally spaced around the perimeter of the annular ring 57 to mount the ring 57 to the brackets 30, 31, 32 fastened to the baffle ring 17. It is understood that any number of tabs can be provided depending upon the rigidity of the support that is desired.

In another embodiment of the fuel burner as shown in FIG. 11, the burner 12' which is generally similar to the burner shown in FIG. 6 is modified by the provision of openings or apertures in the top surface of the burner ring. These openings are in the shape of small orifices which can, if desired, include an upwardly turned edge to better guide the flow of gaseous fuel. The orifices 68 are equally spaced around the top surface of the burner and can extend along the gas conduit support members 70, 71, 72, 73. These orifices can also be distributed in the surface of the central chamber 74, if desired. It should be noted that in this embodiment four gas conduit support members 70, 71, 72, 73 are provided. This arrangement provides a more rigid support for the burner ring 69 and additional area for flow of gas to the burner ring 69.

In FIG. 10 the gas valve 34 is composed of a one-piece body casting 65 in which various ports and openings have been machined. This valve is designed to provide the main gas control and pilot gas control necessary for the combustion function of this invention. The gas is introduced at the inlet 37 and passed to the gas outlet 48 depending upon the position of the control stem 66. The pilot valve outlet 39 is tapped directly into the gas inlet boss 37 and serves to control the pilot flame. A mounting tab 67 is integrally provided in the body 65 of the gas valve 34 for rigidly mounting the gas valve to the bracket 33.

Figure 12:
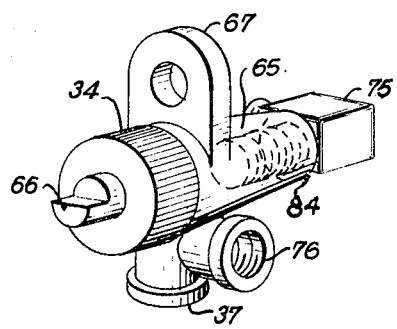
FIG. 12 is a perspective view of another control valve used in this invention.
Figure 15:
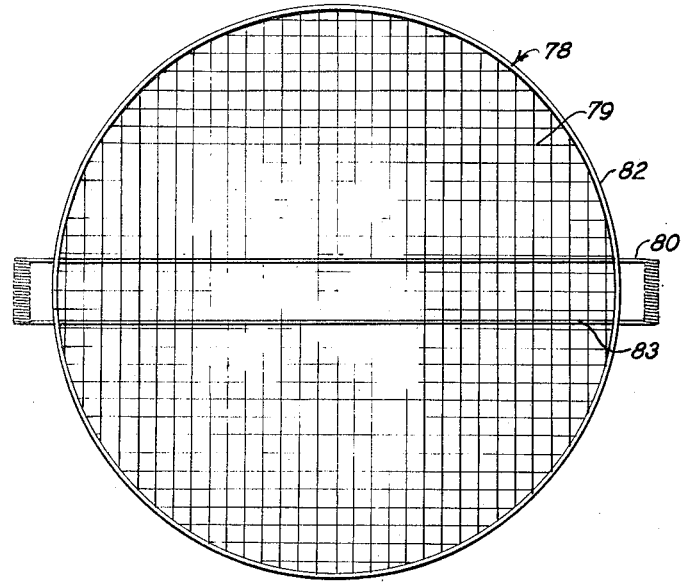
FIGS. 15 and 16 show two views of the mesh basket of this invention.
Figure 13:
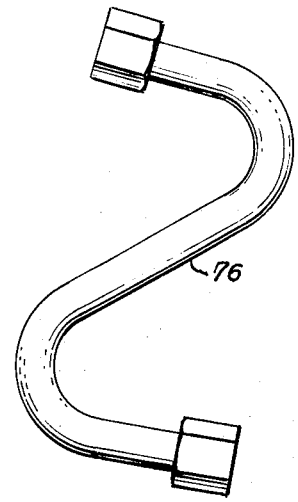
FIGS. 13 and 14 show examples of burner connecting tubes used in this invention.
Figure 16:
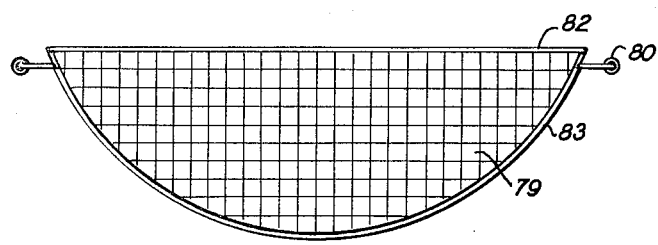
Figure 14:
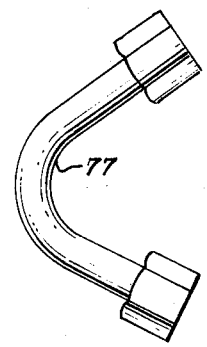

FIG. 12 shows another embodiment of a valve which can be used with the cooking apparatus of this invention. In this embodiment, the valve includes the body casting 65, the control stem 66 positioned in the front end of the body and adapted to control the flow of gas within the valve and the mounting tab 67 integrally cast in the body 65. The conventional gas inlet port 37 is included. A threaded outlet fitting 75 is attached to the valve outlet port 84. In this embodiment, however, the pilot valve shown as an integral part in FIG. 10 is omitted and is installed as a separate valve (not shown) in the pilot tube 40. Because of this, the open port 76 is provided for a tube connection to the separate pilot valve. Also provided in this embodiment is a fuel orifice fitting (not shown) which is inserted in the inlet threaded hole 47 of the gas burner chamber 36. The connecting tubes 76, 77 are examples of a conduit that can be provided to connect the control valve outlet fitting 75 to the burner orifice inlet fitting. The addition of this swing joint connection is provided to allow flexibility and adjustment between the control valve 34 and the burner 12'. An added advantage of this embodiment is that a defective pilot valve or orifice for converting the burner can be easily replaced without the necessity of removing or replacing the entire control valve assembly 34.

An auxiliary open mesh cooking basket can be provided for use with this invention. This basket is designed to correspond with the inside dimension of the cooking bowl 11 and follow the contour of the bowl. The basket 78 is fabricated from an open mesh material 79 which can be made from material such as stainless steel, aluminum or high temperature plastics. A reinforcing ring 82 and supporting member 83 can be provided to form a rigid framework. Heat insulating handles 80 are attached to the rim 82 and form extensions of the support straps 83. The basket can be supported by the handles 80 resting on the top edge of the bowl 11 when in use.

It is to be understood that the burner assembly and the supporting framework can be fabricated from any materials desired, such as steel, aluminum, copper, heat-resistant plastics, etc. However, the selection of light-weight materials should be made to be compatible with the expressed object of providing a readily portable device.

While the invention has been described in terms of preferred embodiments, the claims appended hereto are intended to encompass all embodiments which fall within the spirit of the invention.

Having thus described the invention, what I claim as new and desire to secure by Letters Patent is:

1. A portable cooking apparatus for the preparation of food comprising
   a. a pot for holding the food during the cooking process, said pot being circular and having a continuously convexly curved exterior surface forming the bottom and side thereof to facilitate even distribution of heat across said exterior surface,
   b. support means adapted to support the pot on a base,
   c. said support means comprising at least three spaced support elements for supporting the bottom surface of the pot such that the pot may be leveled independently of the level of the base, an outer cylindrical baffle ring, an inner cylindrical baffle ring concentrically located with respect to said outer baffle ring, each of said baffle rings having a top and a bottom edge, and a gas burner including an annular burner ring concentrically located within said inner baffle ring,
   d. each of said baffle rings being positioned relative to said bottom surface of said pot such that continuous annular spaces are provided between the top cylindrical edge of each of said baffle rings and the bottom surface of said pot, the space between said top edge of each of said rings and the bottom surface of said pot being such that optimum burner combustion and distribution of heat across the bottom surface of the pot is obtained, and
   e. said burner ring being spaced a greater distance from the exterior surface of said pot than the top edges of said baffle rings but above a plane defined by the bottom edge of said inner baffle ring, forming a secondary combustion chamber defined by said burner ring, inner baffle ring and exterior surface of said pot providing improved mixing of air and gas and complete combustion,
   f. whereby a uniform temperature may be maintained throughout said pot during cooking.

2. A portable cooking apparatus as defined in claim 1 wherein the burner includes an inlet fuel-air mixing chamber connected to a central distribution chamber, and a plurality of hollow support conduits extending radially from said central distribution chamber, said annual burner ring being supported on said support conduits and having at least one outlet aperture for passage of the fuel-air mixture, said annular ring being concentrically positioned above the distribution chamber whereby the flow of gas-air mixture from the distribution chamber through the support conduits to the annular burner ring is uniform.

3. A portable cooking apparatus as defined in claim 2 wherein the fuel-air mixing chamber contains at least three adjustable openings for controlling the volume of air entering the mixing chamber whereby improved mixing of air and gas is obtained and the efficiency of the burner is improved, and said support conduits are equally spaced around the distribution chamber to provide an even distribution of gases to the annular burner ring.

4. A portable cooking apparatus as defined in claim 1 wherein the annular burner ring outlet aperture is a continuous narrow slot extending around the annular upper surface of the burner ring to provide an annularly shaped continuous sheet of flame for uniform heat distribution.

5. A portable cooking apparatus as defined in claim 2 wherein the burner includes a main fuel-air burner connected to a fuel control valve and a pilot flame burner connected to a pilot valve and said control valve and said pilot valve are combined in an integral housing.

6. A portable cooking apparatus as defined in claim 1 further comprising an open mesh basket shaped to fit within the pot and adapted to facilitate the handling and removal of the food from the pot.

7. A portable cooking apparatus as defined in claim 4 wherein the diameter of said outer baffle ring is about 90 percent of the diameter of the pot and the diameter of said inner baffle ring is about two-thirds of the diameter of the outer ring.

8. A portable cooking apparatus as defined in claim 7 wherein the axial lengths between the top and bottom edges of said outer and inner baffle rings are about equal and the top edge of the said inner baffle ring defines a plane passing through said outer baffle ring about mid-way between the top and bottom edges thereof.

9. A portable cooking apparatus as defined in claim 1 wherein said support means further comprises at least three legs, one leg extending generally downwardly from each of said support elements.

* * * * *